April 21, 1925.  1,534,880
W. STOEBNER ET AL
PLANT DEFLECTOR
Filed July 9, 1924
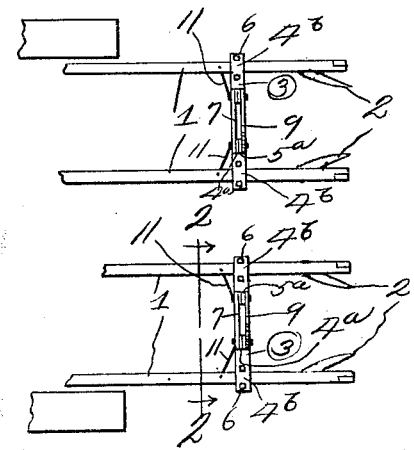
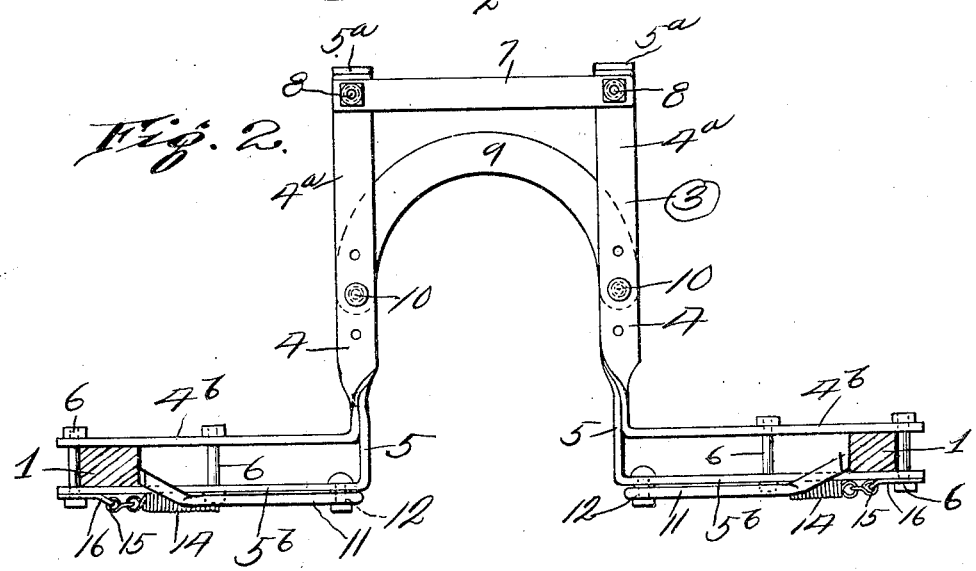
Inventors
W. Stoebner,
E. Stoebner,
E. Stoebner,
D. Stoebner
Attorney Patented Apr. 21, 1925.

1,534,880

UNITED STATES PATENT OFFICE.

WILLIAM STOEBNER, EDWARD STOEBNER, EMANUEL STOEBNER, AND DANIEL STOEBNER, OF TRIPP, SOUTH DAKOTA.

PLANT DEFLECTOR.

Application filed July 9, 1924. Serial No. 725,004.

*To all whom it may concern:*

Be it known that we, WILLIAM STOEBNER, EDWARD STOEBNER, EMANUEL STOEBNER, and DANIEL STOEBNER, citizens of the United States, residing at Tripp, in the county of Hutchinson, State of South Dakota, have invented a new and useful Plant Deflector; and we do hereby declare the following to be a full, clear, and exact description of the invention, such as will enable others skilled in the art to which it appertains to make and use the same.

The invention relates to beam braces for cultivators, and has for its object to provide a device of character which may be easily and quickly attached to the beams of a conventional form of cultivator and constructed in a manner whereby the beams may move in a vertical longitudinal plane incident to the unevenness of the ground, and the beams at the same time braced in a manner whereby side twisting thereof will be prevented, which side twisting of the beams is a common difficulty where discs are carried by the beams.

A further object is to provide spring actuated pivoted deflecting arms for deflecting plants, such as corn into the arched portion of the brace, and preventing the corn stalks from coming into engagement with the sharp edges of the cultivator beams or brace.

A further object is to provide a cultivator beam brace comprising right angularly shaped members having their vertical arms in registration and connected by link members forming a parallel movable device and their horizontal arms provided with means whereby they may be secured to adjacent cultivator beams. Also to provide the lower arms of the horizontally disposed arms with right angularly shaped spring actuated members adapted to cooperate with the inner sides of the cultivator beams for forming deflecting means for plants.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawing:—

Figure 1 is a top plan view of adjacent cultivator beams, showing the braces applied thereto.

Figure 2 vertical transverse sectional view through adjacent cultivator beams taken on line 2—2 of Figure 1.

Figure 3 is an enlarged top plan view of one of the braces.

Referring to the drawing, the numeral 1 designates conventional forms of cultivator beams and 2 discs carried thereby. It has been found that where discs are used on cultivators, particularly the straddle row type, the pressure on the discs imparts a twisting action on the beams 1, and damages the same and at the same time the discing operation is not uniform. To obviate this difficulty the adjacent cultivator beams 1 are connected together by a brace 3. The brace 3 is formed from right angularly disposed brackets 4 and 5. Brackets 4 have their vertical arms 4$^a$ in registration with the vertical arms 5$^a$ of the brackets 5, and the arms 4$^b$ of the right angularly shaped brackets 4 extend over the upper side of the cultivator beams 1, and are secured thereto by means of bolts 6, which extend through the arms 4$^b$ and the arms 5$^b$ of the brackets 5, which last named arms are in horizontal positions and engage the under sides of the beams 1. It will be noted that the bolts 6 are spaced apart, therefore the device may be applied to cultivators having their beams 1 at various distances apart. The upper ends of the arms 4$^a$ and 5$^a$ are connected together by means of a bar 7, the ends of which are pivotally mounted on the bolts 8. Arms 4$^a$ and 5$^a$ are additionally connected together by means of the segmentally shaped bar 9, the ends of which are pivotally connected at 10 to the arms 4$^a$ and 5$^a$. It will be noted by providing the bars 7 and 9 having their ends pivotally mounted to the arms 4$^a$ and 5$^a$, a parallel movement may take place between the opposite brackets, thereby allowing the cultivator beams 1 to move upwardly and downwardly independent of each other, according to the nature of the ground being worked, but at the same time twisting of the beams 1 will be prevented. By forming the bar 9 segmentally shaped, it will be noted that plants may easily pass between the same, particularly corn plants, therefore the brace will not interfere with the use of the device on a straddle row cultivator.

To prevent the corn stalks or other plants from coming into engagement with the sharp edges of the beams 1 and the arms 5ᵇ, and to guide the stalks to positions where they will pass under the segmentally shaped bar 9, forwardly and outwardly extending pivoted arms 11 are provided, which arms are pivotally connected at 12 to the under sides of the arms 5ᵇ adjacent their inner end. Arms 11 are provided with angularly disposed arms 13, which extend outwardly and have connected thereto coiled springs 14, the outer ends of which are connected at 15 to links 16 which are pivotally mounted on the lower ends of the bolts 6, and it will be noted, that by referring to Figure 3, the springs 14 will maintain the forward ends of the arms 11 in engagement with the inner sides of the cultivator beams 1 and the arms 11 will guide corn stalks and other plants into a position, where they will pass under the bar 9. By providing the springs 13, the arms 11 will be maintained in engagement with the inner sides of the cultivator beams 1, and the device can accommodate itself to cultivators having beams at different distances apart and of different widths, therefore the device can be applied to any conventional form of cultivator.

From the above it will be seen that a brace is provided for adjacent cultivator beams, and which brace will prevent spreading or twisting of the beams, and at the same time will allow freedom of movement of the beams in a longitudinal vertical plane independent of each other, especially when the cultivator is going over rough ground. It will also be seen that the bars 7 and 9 prevent the beams 1 from twisting, but at the same time allow a parallel movement of the beams 1 during their vertical movement.

The invention having been set forth what is claimed as new and useful is:—

1. A plant deflector comprising spaced beams a bracket carried by the beams, pivoted arms carried by the bracket and extending forwardly and outwardly into engagement with the inner sides of the beams, said pivoted arms being provided with outwardly extending arms and springs co-operating with the outwardly extending arms and forming means for holding the pivoted arms in engagement with the beams.

2. A plant deflector comprising spaced beams, inwardly extending brackets carried by said beams, pivotally angularly shaped levers pivoted to the undersides of said brackets, one arm of said lever extending outwardly towards the beams, coiled spring connections between said last named arms and the beams, the other arms of said angularly shaped levers extending forwardly and outwardly into engagement with the adjacent sides of the beams.

In testimony whereof we have signed our names to this specification in the presence of two subscribing witnesses.

WILLIAM STOEBNER.
EDWARD STOEBNER.
EMANUEL STOEBNER.
DANIEL STOEBNER.

Witnesses:
HENRY KLATT, Jr.,
OSCAR BRASZ.